United States Patent [19]
Schlang
[11] 3,772,648
[45] Nov. 13, 1973

[54] ELECTRO-OPTICAL CHARACTER READER

[75] Inventor: Arthur Schlang, Woodbury, N.Y.
[73] Assignee: Isotec Incorporated, Woodbury, N.Y.

[22] Filed: June 11, 1971
[21] Appl. No.: 152,104

[52] U.S. Cl. .......... 340/146.3 J
[51] Int. Cl. .......... G06k 9/18
[58] Field of Search .......... 340/146.3

[56] References Cited
UNITED STATES PATENTS

| | | | |
|---|---|---|---|
| 3,160,855 | 12/1964 | Holt | 340/146.3 ED |
| 3,569,622 | 3/1971 | Mengani | 340/146.3 H |
| 3,551,887 | 12/1970 | Vaccaro et al. | 340/146.3 H |
| 3,593,287 | 7/1971 | Kobayashi et al. | 340/146.3 J |
| 3,140,466 | 7/1964 | Greanias et al. | 340/146.3 AC |
| 3,531,770 | 9/1970 | Mauch et al. | 340/146.3 J |

*Primary Examiner*—
*Assistant Examiner*—Leo H. Boudreau
*Attorney*—Edward H. Loveman

[57] ABSTRACT

An electro-optical character reader for a font of two dimensional plane characters based on an ideal plane matrix of two mutually perpendicular sets of linear strokes, comprising a linear array of scanning sensor elements disposed to scan one character at a time while the characters move in a direction perpendicular to the array of sensors. A logic circuit converts data pulses corresponding to detected strokes to data bits corresponding to characters scanned. The circuit includes means for detecting beginning and end edges of characters in their path of movement and is adapted to scan alphabetic and numeric characters inscribed in ideal form.

7 Claims, 16 Drawing Figures

FIG. 1

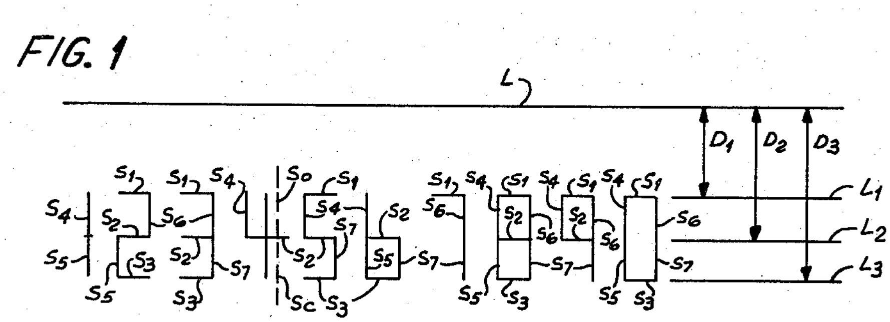

FIG. 4B

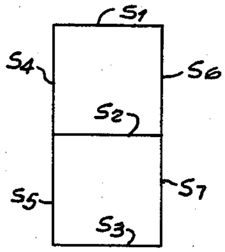

FIG. 2

STROKE

| NUMERAL | $S_1$ | $S_2$ | $S_3$ | $S_4$ | $S_5$ | $S_6$ | $S_7$ |
|---|---|---|---|---|---|---|---|
| 1 | $\bar{X}$ | $\bar{X}$ | $\bar{X}$ | X | X | $\bar{X}$ | $\bar{X}$ |
| 2 | X | X | X | $\bar{X}$ | X | X | $\bar{X}$ |
| 3 | X | X | X | $\bar{X}$ | $\bar{X}$ | X | X |
| 4 | $\bar{X}$ | X | $\bar{X}$ | X | $\bar{X}$ | $\bar{X}$ | $\bar{X}$ |
| 5 | X | X | X | X | $\bar{X}$ | $\bar{X}$ | X |
| 6 | $\bar{X}$ | X | X | X | X | $\bar{X}$ | X |
| 7 | X | $\bar{X}$ | $\bar{X}$ | $\bar{X}$ | $\bar{X}$ | X | X |
| 8 | X | X | X | X | X | X | X |
| 9 | X | X | $\bar{X}$ | X | $\bar{X}$ | X | X |
| 0 | X | $\bar{X}$ | X | X | X | X | X |

FIG. 4A

| NUMERAL | $S_2$ | $S_4$ | $S_5$ | $S_6$ | $S_7$ |
|---|---|---|---|---|---|
| 1 | $\bar{X}$ | | | | $\bar{X}$ |
| 2 | | | | X | $\bar{X}$ |
| 3 | X | $\bar{X}$ | $\bar{X}$ | | |
| 4 | | | $\bar{X}$ | | $\bar{X}$ |
| 5 | | | $\bar{X}$ | $\bar{X}$ | X |
| 6 | | | X | $\bar{X}$ | X |
| 7 | $\bar{X}$ | $\bar{X}$ | | | |
| 8 | X | X | X | X | |
| 9 | | X | $\bar{X}$ | X | |
| 0 | $\bar{X}$ | X | | X | |

FIG. 3A

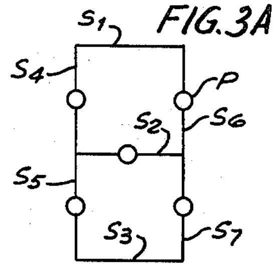

FIG. 3B

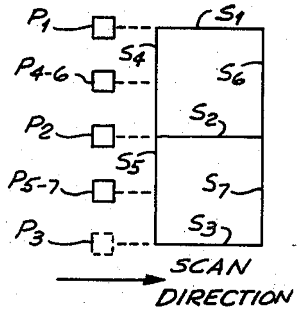

FIG. 5

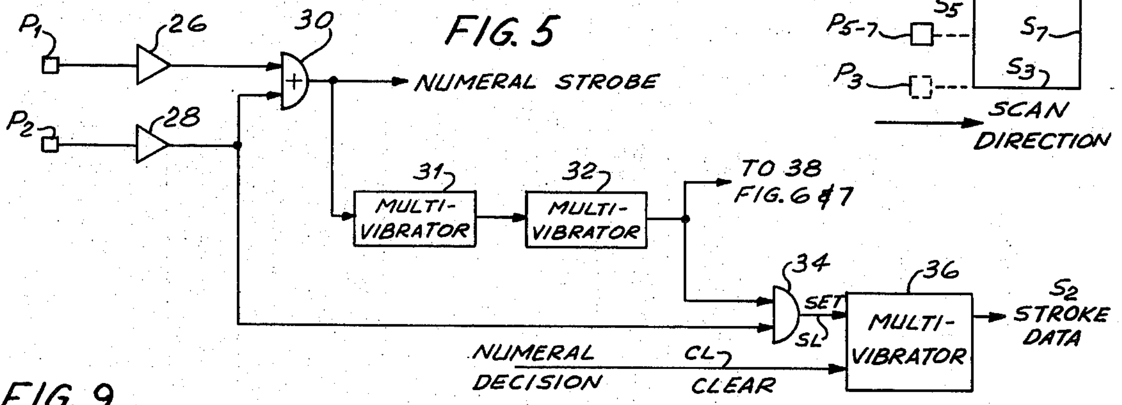

FIG. 9

| NUMERAL | $2^3$ | $2^2$ | $2^1$ | $2^0$ |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 0 | 0 | 0 | 0 |

FIG. 10

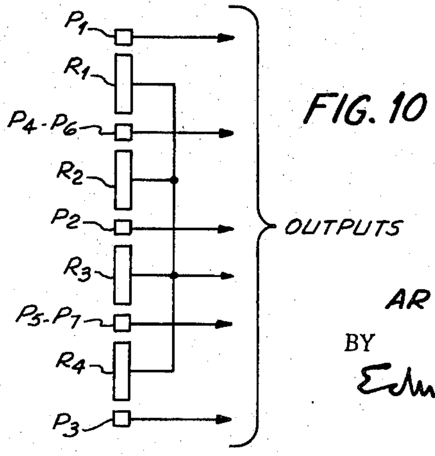

INVENTOR.
ARTHUR SCHLANG
BY
Edward H Loveman
ATTORNEY

INVENTOR.
ARTHUR SCHLANG
BY Edward H. Loveman
ATTORNEY

INVENTOR.
ARTHUR SCHLANG
BY
Edward H. Loveme
ATTORNEY

ELECTRO-OPTICAL CHARACTER READER

This invention relates to optical character reading machines and more particularly concerns an electro-optical character reader which ascertains the identity of characters of a suitable prescribed font by optically scanning each character and ascertaining its single dimensional temporal characteristics.

In accordance with the invention, the requisite identifying information with respect to each character is derived by optical scanning. This information is electronically processed into an electrical signal format which a computer or its peripheral equipment is capable of receiving and interpreting. The present character reader is insensitive to common character imperfections and abnormalities, such as dimensional errors of character components, character rotation, character displacement, character distortion, and flaws and can thus read printed field format numeric or alpha characters in ideal form or in distorted form. The invention is further adapted to scan and read alphabetical letters and symbols, so that it can serve as an alpha-numeric character reader. Here too, the character reader can read characters prescribed in ideal form or in distorted form.

Accordingly it is a principal object of the present invention to provide an optical character reader which obtains identifying information with respect to each character by optical scanning.

Another object of the present invention is to provide an electrical optical reading machine which is insensitive to common character imperfections and abnormalities.

Still another object of the present invention is to provide an electrical optical reading machine which can read alphanumeric characters in a variety of fonts.

These and other objects and many of the attendant advantages of this invention will be readily appreciated as the same becomes better understood by reference to the following detailed description when considered in connection with the accompanying drawings in which:

FIG. 1 is a diagram of a font of numerals having ideal configuration for use in an electro-optical character reader according to the invention;

FIG. 2 is a table listing the constituent strokes of each of the numerals of FIG. 1;

FIG. 3A is a diagram of a two dimensional array of photocells for stroke detection;

FIG. 3B is a diagram of a one dimensional array of photocells for stroke detection;

FIG. 4A is a simplified table of constituent strokes of numerals;

FIG. 4B is a diagram of a numeral of ideal configuration with stroke designations thereon;

FIG. 5 is a diagram of a circuit employed to derive numeral stroke information from a scanning sensor;

FIG. 9 is a table indicating the binary state of output lines of the binary converter of FIG. 8;

FIG. 10 is a diagram of an array of photocells for scanning alpha-numeric characters;

Figures 6, 7, 11A:
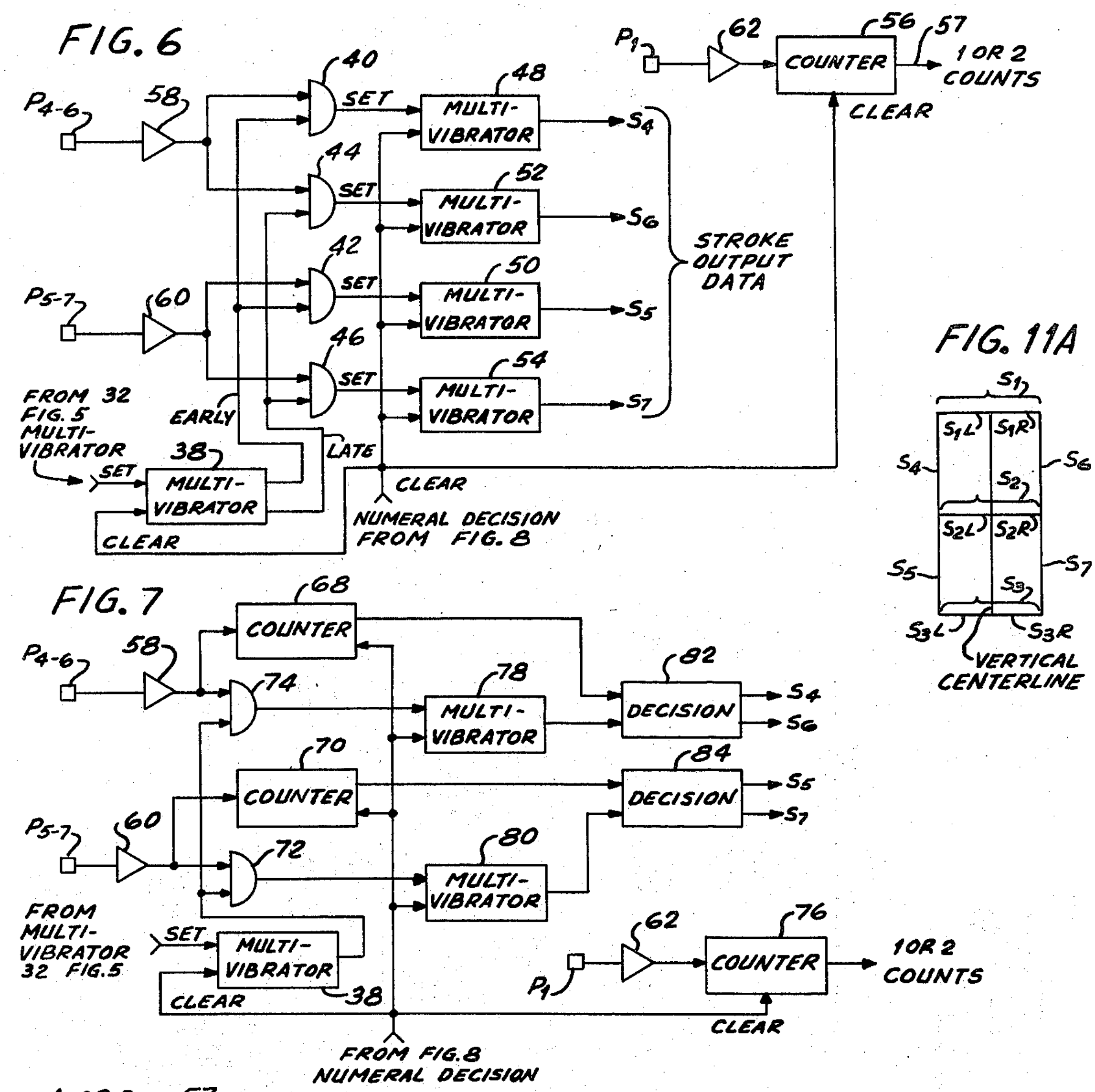
FIG. 6 is a diagram of a circuit employed for vertical stroke discrimination, and used in conjunction with the circuit of FIG. 5.
FIG. 7 is a diagram of vertical stroke discrimination involving a modification of the circuit of FIG. 6.
FIG. 11A is a diagram of a scanned character matrix with stroke designations.

Referring, now to the drawings wherein like reference characters designate like or corresponding parts throughout, there is illustrated in FIG. 1 numerals "1" through "9" and "0" of a prescribed font of rectangular numerals. All numerals except numeral "4" are composed of combinations of two or more strokes $S_1$ through $S_7$. Only numeral "8" utilizes all available strokes $S_1$ through $S_7$. There are three horizontal strokes $S_1$, $S_2$ and $S_3$, each of whose length is equal to the full numeral width and which are invariant from numeral to numeral. Numeral "4" is an exception and utilizes one additional long stroke $S_0$ which precedes a vertical center line $S_c$ and is not co-linear with the strokes $S_4$, $S_5$, $S_6$ or $S_7$. The stroke $S_1$ is co-linear with a line $L_1$, which is parallel to and at a distance $D_1$ from a reference line L which may be the top edge of a form being read. Similarly, stroke $S_2$ lies on a line $L_2$, which line bisects all numerals vertically. The line $L_2$ is parallel to the reference line L and is at a distance $D_2$ from the reference line or top edge L of the form being read. Stroke $S_3$ lies on a line $L_3$ which is also parallel to the reference line or edge L at a distance $D_3$. The lines $L_1$ and $L_3$ are as a consequence equidistant from the line $L_2$ which mandates that the vertical strokes $S_4$, $S_5$, $S_6$ and $S_7$ be equal to each other in length and constant in length from numeral to numeral. The strokes $S_4$ and $S_5$ are co-linear with one another as are the strokes $S_6$ and $S_7$. All angles are right angles and fillets and rounded corners are avoided. However, a less than ideal font of rectangular numerals can also be accommodated by the system, for example, the 7B font, as jointly established by the Farrington and Addressograph groups, is readily accepted by this simplified version of the electro-optical character reader.

FIG. 2 summarizes in tabular form the constituent strokes of each numeral. The letter "X" signifies the presence of a stroke while "$\overline{X}$" (read as X not) denotes stroke absence, which stroke absence or presence is ascertained by electro-optical techniques. Analysis of FIG. 2 indicates that knowledge of the strokes $S_1$ and $S_3$ provides redundant data in that numeral identity can be made on the basis of knowledge concerning the strokes $S_2$, $S_4$, $S_5$, $S_6$ and $S_7$ to the exclusion of the strokes $S_1$ and $S_3$. Each horizontal row in FIG. 2, denoting a different numeral, then contains a singular pattern of X and $\overline{X}$ which unambiguously distinguishes its corresponding numeral from all other numerals. The first apparent solution for the stroke detection processes, is the utilization of a pattern of five photocells. P is a two-dimensional array as shown in FIG. 3A, wherein the photocells are superimposed over the numeral "8" in an idealized portrayal. This approach has certain disadvantages which are occasioned by the necessity to match up two dual dimensional figures; as for example, when photocells reside directly over the strokes $S_2$, $S_4$ and $S_5$, dimensional errors of such strokes may cause either or both photocells intended to detect the strokes $S_6$ and $S_7$ to miss their respective targets. Similar errors can also be induced by rotational errors of such strokes where, for example, cells on the strokes $S_2$, $s_5$ and $S_6$ are active while the strokes $S_4$ and $S_7$ are bypassed. Thirdly, displacement errors of such strokes in either the vertical and/or the horizontal directions cause the photocells to miss relevant data. If one attempts to duplicate FIG. 3A in an effort to match the numerals on a one-to-one basis in a line of data, one must contend with inter-numeral spacing aberrations in addition to the previously mentioned errors. As will be explained, using only the three vertically aligned photocells P4–6, P2 and P5–7 of FIG. 3B, in lieu of the five photocells P of FIG. 3A, renders the optical character reader significantly less prone to the previously mentioned errors. For the moment, ignore photocells P1 and P3; however, where the pattern of five photocells could ascertain numeral identity with the simultaneous reading of all strokes, FIG. 3B illustrates a one dimensional arrangement of photocells which requires the numeral and array to be physically scanned past one another to gather stroke data on a time sequential basis. Thus FIG. 3A represents a purely spatial or geometric scheme while FIG. 3B depicts photocell temporal observation. In FIG. 3B a single photocell P4–6 asynchronously detects the absence or presence of strokes $S_4$ and $S_6$ while a single cell P5–7 detects the strokes $S_5$ and $S_7$, also at different points in time. As the vertical character strokes impinge upon their respective photocells, each such photocell generates a short electrical impulse. Conversely horizontal stroke $S_2$ induces a long electrical impulse in its photocell by virtue of its greater physical length. The first pulse from photocell P4–6 or from P5–7 in FIG. 3B discloses the presence of vertical strokes $S_4$ or $S_5$ respectively while the second pulse indicates the presence of vertical strokes $S_6$ or $S_7$ respectively. What is now required is a strobing signal whereby decision making circuits may determine whether the single pulse from the photocell P4–6 or the cell P5–7 is derived from the vertical stroke $S_4$ (or $S_5$) or from the vertical stroke $S_6$ (or $S_7$). Ideally, the strobing signal should be initiated when the leading edge of the numeral enters the photocell array, and terminate when the last element of that numeral leaves the photocell array. The numerals of FIG. 1 lend themselves to what is here termed, "self strobing characteristics," i.e., there is contained within each of said numerals at least one unbroken horizontal stroke extending through the entire width of said numeral and which stroke is not exceeded in width by any other numeral element. A fourth photocell P1 is required for FIG. 3B which detects horizontal stroke $S_1$, and serves only for strobing or timing and not for numeral identification. A fifth photocell P3 indicated by dotted lines is not required for detecting stroke $S_3$ as previously explained. Electrically adding the outputs of photocells P1 and P2 provides the required numeral strobe for all numerals with horizontal stroke $S_2$ now serving the dual function of providing both identification data and strobing information. The numeral strobe serves a second function in that identification of a numeral is thereby made only after the numeral has first been fully scanned. Such a technique insures that all available data about a numeral has been collected prior to any determination process being initiated. This is in contra-distinction to the manner in which the human eye-brain combination performs, that is, by pattern recognition.

With regard to the table of FIG. 2, it may be simplified as shown in FIG. 4A with FIG. 4B included for reference. It was previously demonstrated that horizontal strokes $S_1$ and $S_3$ could be eliminated and now the rationale for further simplification is given. Examining numeral "1," it is apparent that if there is an $\overline{X}$ in both stroke positions, $S_2$ and $S_7$, then no other stroke information about this numeral is required inasmuch as no other numeral contains this distinctive combination. Also, observe that a numeral determination can be made on the basis of what stroke is absent as well as on the basis of what stroke is present. The X, $\overline{X}$ pattern in stroke columns $S_6$ and $S_7$ is singular for numeral "2" as seen by referring back to FIG. 2. For positive identification, some numerals require knowledge of three strokes while numeral "8" requires data on four strokes. The long vertical stroke on numeral "4" in FIG. 1 is so placed as to form a symbol familiar to the eye but it is not required for numeral identification. The previous examples of simplification were arrived at by inspection and the remaining numerals can also be so simplified.

It will now be explained how the photocell outputs are processed to derive stroke information. Later this data is processed to form numeral identification information on nine wires. Lastly such numeral identification data, for final processing by a digital computer, is converted to standard machine language as ASCII and EBCDIC, i.e., an electrical signal format that a computer or its peripheral equipment is capable of receiving and interpreting. In FIG. 5, the presence of data is detected by cells P1 and P2 and each data bit is subsequently amplified prior to processing in a pair of amplifiers 26 and 28. These outputs are added in an adder 30 to form a numeral strobe which frames the full numeral width. The output of adder 30 also activates a monostable multivibrator 31 to turn on simultaneously with the leading edge of the numeral strobe. The monostable multivibrator 31 automatically turns off timewise approximately in the middle of a numeral. Thus if a numeral is scanned by the photocell array in 30 milliseconds, the monostable multivibrator 31 turns itself off after approximately 15 milliseconds. This timing is noncritical and may vary significantly about the midpoint, provided, however, that it occurs after the center of the vertical stroke of the numeral "4." When the monostable multivibrator 31 turns off, it triggers a monostable multivibrator 32 which generates a very narrow pulse whose duration in time is less than the time of passage of one vertical stroke width. This narrow pulse energizes AND gate 34 whose second input is the amplified output of the photocell P2. The AND gate 34 generates an output only if both its inputs are simultaneously energized. If a single vertical stroke is detected by the cells P1 and P2, AND gate 34 then receives a narrow pulse from the monostable multivibrator 32 about the center line of the numeral, but since the vertical stroke has long since terminated the gate 34 remains unresponsive. Conversely, if P2 detects a wide horizontal stroke, then the monostable multivibrator 32 will fire such that AND gate 34 generates an output which sets a bi-stable multivibrator 36 to its logical "1" state to denote the presence of the stroke $S_2$.

Typically, the bi-stable multivibrator 36 exhibits two electrical states where normally its output is at logical "0. "When AND gate 34 produces a signal on the "set" line SL, the bi-stable multivibrator 36 changes state to a logical "1" indicating that a wide horizontal stroke ($S_2$) has been detected since as described above, the narrow vertical strokes never propagate through AND gate 34 to set the bi-stable multivibrator 36. The essential purpose of the bi-stable multivibrator 36 is to provide the memory for the horizontal stroke $S_2$ necessary for all requisite numeral components before making any decision of numeral identity. The bi-stable multivibrator 36 is cleared, that is, its output is returned to zero level by means of the clear line CL after a numeral decision has been made and the circuit is ready to read the next following numeral.

The output of the monostable multivibrator 32 is also used for edge detection as shown by the diagram of the Vertical Stroke Discriminator in FIG. 6. The bi-stable multivibrator 38 initially, in FIG. 6, is in its clear state (the early output is binary "1," and the late output is binary "0" as instituted by the numeral decision (derived from the logic circuit of FIG. 8) of the previous numeral or some initiating control when the optical character reader is first turned on. A pair of AND gates 40 and 42 are then receptive to data while a second pair of AND gates 44 and 46 are inactivated. Data from photocells P4–6 and P5–7, if present, are amplified via respective amplifiers 58 and 60 and are propagated through AND gates 40 and 42 and set the proper bi-stable multivibrators 48 and/or 50 to indicate if the strokes $S_4$ and $S_5$ are present. Numeral "5" for example sets the bi-stable multivibrator 48 but has no effect on the bi-stable multivibrator 50. Conversely numeral "2" leaves the bi-stable multivibrator 48 untriggered but sets the bi-stable multivibrator 50. Numeral "3" sets neither bi-stable multivibrator 48 nor the bi-stable multivibrator 50.

At approximately the center-line of each numeral, the monostable multivibrator 32 of FIG. 5 generates a pulse which sets the bi-stable multivibrator 38 of FIG. 6 such that the early output is binary "0" and the late output is binary "1." The AND gates 40 and 42 are no longer required because the leading edge vertical strokes have passed and are thus inactivated, whereas the AND gates 44 and 46 are receptive to data from the strokes $S_6$ and $S_7$. A bistable multivibrator 52 remains unchanged for the numeral "5" but a bi-stable multivibrator 54 sets to show the presence of a stroke. Conversely the bi-stable multivibrator 52 sets to show a stroke for the numeral "2" but the bi-stable multivibrator 54 remains fixed. Both of the bi-stable multivibrators 52 and 54 set for the numeral "3." As for the bi-stable multivibrator 36 of FIG. 5, the bi-stable multivibrators 48, 52, 50 and 54 in FIG. 6 are required for memory to insure that electrical data of a numeral's elements are retained for identity determination after the numeral has departed from exposure to scanning. All bi-stable multivibrators are returned to their quiescent states (cleared) after a numeral decision has been made. With this method, if the long vertical stroke of numeral "4" occurs after the middle of the numeral, this stroke would be interpreted as strokes $S_6$ and $S_7$ rather than be ignored. The numeral "4" would read as a "9" but numeral "9" would still be correctly read. The consequent criticalness in timing is eliminated as follows: The photocell output of P1 (FIG. 6) which in all other previous instances only provides strobing information, is amplified by an amplifier 62 and also drives a counter 56 which accumulates the numer of impulses contained in any individual numeral on stroke level $S_1$. All numerals except "4" contain one count while numeral "4" contains two (FIG. 1). A wide stroke, as on numeral "7" applies as a single count because it has no breaks, but numeral "4" contains a single break and thus applies a count of two. The determination of the numeral "4" is thereby obtained by examining the output of the counter 56 at decision making time. If a count of two is contained within the counter 56, the output thereof 57, deactivates the "9" decision block of FIG. 8 since that block with faulty timing could erroneously decode the numeral "4" as a "9." This counting technique may, if desired, be carried further and FIG. 6 may be modified into FIG. 7. The number of impulses for a numeral from the photocells P4–6 and P5–7 are counted in a pair of respective counters 68 and 70. If two counts per photocell are detected, then both left and right edges are signified as being present. If one count is detected i.e., in counter 70, and an associated left edge detector AND gate 72 generates an output, then the edge is left edge $S_5$. Conversely, if counter 70 generates one count AND gate 72 has no output, then the edge signified thereby is right edge $S_7$. Note that for a dual count, the left edge detector 72 is activated but its output is ignored since the counter 70 signifies the presence of both edges. A similar strategy applies to stroke $S_4$ and $S_6$ which utilize a counter 68 and the AND gate 74. A counter 76 is again employed to aid in the detection of numeral "4" in the same manner as described with reference to FIG. 6. The outputs of counter 68 and a bi-stable multivibrator 78 drive a decision block 82 which generates stroke data $S_4$ and/or $S_6$ and similarly a decision block 84 is driven by the outputs from the counter 70 and a bi-stable multivibrator 80 to generate stroke data $S_5$ and/or $S_7$. The decision blocks 82 and 84 are utilized for the strokes, vertical only, and are not to be confused with numeral decision of FIG. 8.

Each counter 68 and 70 and 76 may be implemented by a toggled multivibrator, that is, a circuit element which exhibits two stable states which interchange every time one trigger pulse enters the block. This is permissible instead of employing a true counter, since each numeral always induces either one or two counts, but never zero or more than two counts. Initially the toggled multivibrator is set by the prior numeral decision to a logical "1." If there is one count, the device reads logical "0" at decision time and if two counts, the unit reverts back to a logical "1" prior to decision time. Some noise immunity can be achieved by replacing each of the counters 68, 70 and 76 with a two stage shift register. When these registers are full, they ignore additional pulses. Thus, if a double count is indicated in the numeral being read, an additional noise pulse cannot change the count. However, a single count in the register can erroneously change to a double count with a noise pulse. The counters 68, 70 and 76 and the bi-stable multivibrators 78 and 80 are cleared by erasure of the preceding stroke memory by numeral decision of FIG. 8 as were the bi-stable multivibrators 48, 52, 50 and 54 of FIG. 6.

Granularity in a vertical stroke can induce a counter to record a single stroke as more than one stroke. This undesirable effect can be minimized by three techniques. One method is to limit the frequency band of the photocell amplifier and/or to defocus the numeral image projected on the photocell array. A better approach is to trigger a monostable multivibrator with the vertical stroke signal and to set the period of the multivibrator longer than any stroke width but not so long as to run into a numeral's second stroke. Thus a clean unbroken output is obtained that completely eliminates noise in the stroke signal and one that cannot be misinterpreted by the counter. Interestingly enough, left and right edge detectors are insensitive to stroke granularity and represent the preferred detection approach for badly situated characters. Small dirt spots can cause the erroneous triggering of the above mentioned monostable multivibrator but these effects are further limited by examining raw stroke data a second time at a fixed time delay after such data occurs. If the data is still present at the second observation, then it is accepted as being legitimate, otherwise it is rejected as being extraneous.

Figure 8:
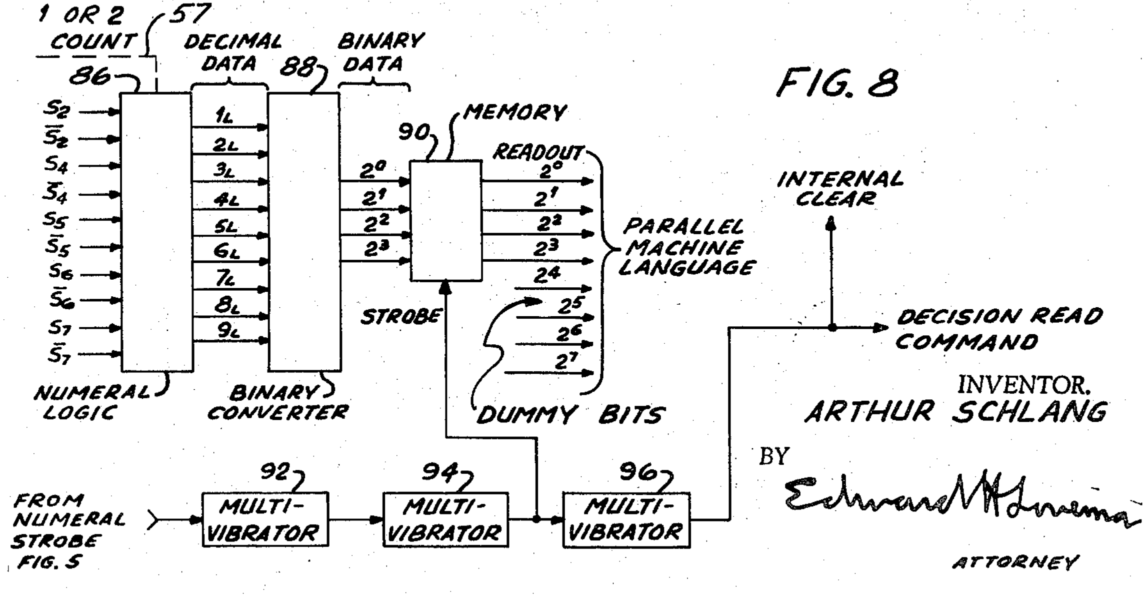
FIG. 8 is a diagram of logic circuitry employed to convert stroke data obtained from the circuits of FIGS. 5 and 6 or 7 to data bits representative of numerals.

In FIG. 8, numeral logic 86 generates numeral decimal data from the stroke data. To evolve a numeral identity from stroke information, a separate AND gate within the numeral logic 86 is utilized for each numeral. Such a device accommodates a fixed number of inputs which must be at a logical "1" before the gate generates an output. If all but one input is logical "1," no output is generated. From the table of FIG. 4A, the numeral "8" requires a four-input gate to accept data from strokes $S_2$, $S_4$, $S_5$ and $S_6$. No input is required from stroke $S_7$ as this represents superfluous data. Numeral "3" requires a three-input gate to accept data on stroke $S_2$ and "not" stroke data on $S_4$ and $S_5$. That is, logical "1" is developed on strokes $S_4$ and $S_5$, if no strokes exist in positions $S_4$ and $S_5$. Lastly, numeral "9" requires a three-input gate, that examines data on strokes $S_4$ and $S_6$ and "not" data on stroke $S_5$. An additional input to "9" may be added to accomodate numeral "4" in that a single count must exist at photocell P1 for the three line data of "9" to be accepted as valid information. The numeral "4" requires no decoding since a double count at photocell P1 can only represent a numeral "4." There are nine outputs from numeral logic 86 of FIG. 8 where no decoding of the numeral "0" is required.

This so called decimal information is converted in a binary convertor 88 to binary data in conformance with the table of FIG. 9 which is the first step in evolving a machine language representation. To implement this conversion, four "or" gates are employed. These devices have a fixed number of inputs, but a logical "1" on any combination of inputs produces a gate output. The gate for the $2^0$ line has five inputs capable of excitation by numerals "1," "3," "5," "7" and "9 " but not "2," "4" "6," "8" and "0" which directly follows the dictates of FIG. 9. The $2^1$ line utilizes a four-input gate. Numeral "0" develops all zeroes on the binary converter output. When a numeral "0" is detected, the nine lines to the binary converter 88 are zero and the "or" gates in turn produce no outputs.

The four data lines from the binary converter 88 of FIG. 8 are in a constant state of flux as a numeral is being scanned. It is intended only to examine these lines once numeral scanning is complete and this is termed "decision time." A memory 90 contains four latching circuits which retain the last data entered at the termination of the narrow strobe input signal. This strobe is generated in this manner: The trailing edge of the numeral strobe shown in FIG. 5, which denotes character termination time, triggers a monostable multivibrator 92 which in turn generates a fixed width pulse introducing a time delay. This insures that a numeral decision is deferred until after a character has passed and not during termination when stroke information is still being accumulated. A second monostable multivibrator 94 generates a narrow pulse and is triggered on the trailing edge of the monostable multivibrator 92 waveform. Thus, when the monostable multivibrator 94 fires, data is quiescent and ready for decision making. A monostable multivibrator 96 fires on the trailing edge of the monostable multivibrator 94 strobe or at a time when the numeral has been committed to memory in memory 90 and so instructs any subsequent system blocks, as a magnetic tape recorder, to examine the four line memory for valid information. This waveform of monostable multivibrator 96 also clears all of the memory elements which are in the bistable multivibrator 36 of FIG. 5, the bi-stable multivibrators 48, 50, 52, 54 and 38 of FIG. 6 and the bi-stable multivibrators 36, 78 and 80 of FIG. 7 which thereby renders the electro-optical character reader receptive to the next numeral. The memory 90 of FIG. 8, however, retains numeral information which may be continually examined even during scanning of the following numeral. Only upon firing of the monostable multivibrator 94 is this information updated. For most commercial codes, the addition of dummy bits to the numeral binary representation completes the conversion to machine language. The added bits are placed on permanently connected wires and are shown in FIG. 8, and are labeled as bits $2^4$, $2^5$, $2^6$ and $2^7$. This represents an eight-bit format although other bit formats are easily realized by utilizing more or less dummy bits.

Voids and imperfections in horizontal strokes $S_1$ and/or $S_2$ can cause the electro-optical character reader to initiate a premature read-out cycle since solid continuity in these strokes is required for the self-strobing scheme to operate properly. Assuming such flaws are of minimal size, there are three means for eliminating their effects. A circuit may be constructed that, upon the detection of an interruption in the numeral strobe, examines the numeral strobe once again but delayed in time from the first observation. If the signal is still zero at the second observation, an end of character command is initiated, otherwise, the first signal interruption is ignored as being a character flaw. The pulse width of the monostable multivibrator 32 of FIG. 5 should also be wider then any anticipated void so that the horizontal stroke detection capabilities is not compromised. The second method of eliminating the effects of flaws in horizontal strokes is to cause the leading edge of the numeral strobe to trigger a monostable multivibrator whose generated pulse width is greater than the numeral width but not so wide as to impinge upon the following numeral. The trailing edge of the monostable multivibrator pulse then initiates numeral decision making. The need for a self-strobing character is no longer required, but careful adjustment and good stability of the monostable multivibrator is required. The third solution involves the reading of preprinted timing marks by an added photocell. These marks are not visible to the other sensor photocells of FIG. 3B but delineate the midpoint of the internumeral space.

EXAMPLES OF OPERATION

For purposes of illustration, suppose numerals "2," "4," "6" and "7" are sequentially translated before the electro-optical character reader and the resultant signal flow is traced. The numeral configurations and numeral stroke designations are shown in FIG. 1 for the four illustrative numerals. The photocell array and designations are shown in FIG. 3B.

Referring to FIG. 1, numeral "2" contains both strokes $S_1$ and $S_2$ which cause the photocells P1 and P2 in FIG. 5 to generate outputs indicative of stroke presence. The amplifiers 26 and 28 in FIG. 5 enhance the signal levels which are then combined in the adder 30 to form the numeral strobe which, as may be recalled, rises to some fixed voltage at the onset of the numeral and reverts to zero voltage at the termination of the numeral. For numeral "2," strokes $S_1$ and $S_2$ are redundant since they occur simultaneously. The numeral strobe voltage waveform is identical whether one or both strokes $S_1$ and $S_2$ are present.

The output from the adder 30 also triggers the monostable multivibrator 31 which then generates a waveform rising in level simultaneously with the leading edge of numeral "2," settles at some fixed level independent of the trigger voltage, and terminates in time also independently of the input level. The time of termination is adjusted to lie midway between the full numeral strobe time. Numeral strobe time is derived knowing the numeral physical width and the speed at which it is moved past the photocell array.

The trailing edge of the output of the monostable multivibrator 31 triggers the monostable multivibrator 32 whose output rises simultaneously with the fall of the trigger waveform. The waveform of the output of the monostable multivibrator 32 terminates very quickly so that a narrow pulse is developed near the middle of the numeral strobe time interval. This process is applicable to any and all numerals and symbols since either stroke $S_1$ or stroke $S_2$ or both strokes are always present. Of the numerals given for illustration, "4" is lacking stroke $S_1$, "7" lacks stroke $S_2$ and numerals "2" and "6" contain both strokes $S_1$ and $S_2$, but the numeral strobe and the firing of the monostable multivibrator 32 are unaffected by these differences.

The output of the monostable multivibrator 32 drives one input of the AND gate 34 whose other input is the amplified output of the photocell P2. The AND gate 34 generates an output only when both inputs are simultaneously present. Thus for numeral "2," stroke $S_2$ presence is indicated when the monostable multivibrator 32 fires thus permitting the AND gate 34 to generate an output. The same is true for numerals "4" and "6" but not for numeral "7" since it lacks stroke $S_2$. The output of the AND gate 34 is thus an indication of whether stroke $S_2$ is present or not. The bi-stable multivibrator 36 memorizes the output of the AND gate 34 until numeral decision time which occurs after all stroke data is accumulated ($S_1$, $S_2$, $S_4$, $S_5$, $S_6$ and $S_7$). Initially the bi-stable multivibrator 36 generates a binary "0" (zero) output. When a pulse emanates from the AND gate 34, the bi-stable multivibrator 36 sets its output to binary "1" indicating the presence of a stroke $S_2$. This circuit component remains in this state until it is returned to binary "0" after decision time in order to accommodate the next numeral.

The output of the monostable multivibratoe 32 also drives the Vertical Stroke Discriminator Circuit of FIG. 6. The pulse from this multivibrator effectively bisects a numeral into left and right segments which are analyzed in FIG. 6 for presence of vertical strokes ($S_4$, $S_5$, $S_6$ and $S_7$). FIG. 7 also permits a similar analysis utilizing a somewhat different technique but equally as viable as that in FIG. 6. For purposes of illustration, however, the numerals "2," "4," "6" and "7" are now traced through FIG. 6.

In FIG. 6, the bi-stable multivibrator 38 initially generates a binary "1" on its Early output and a binary "0" on its Late output. Thus the AND gates 40 and 42 are initially receptive to data while the AND gates 44 and 46 are not. After the mid-numeral strobe, this situation reverses. The photocell P4–6 detects the presence of strokes $S_4$ and $S_6$ which data is amplified in the amplifier 58 and presented for acceptance to the AND gates 40 and 44. For numeral "2" stroke $S_4$ is not present; thus the AND gate 40 develops no output. After the bi-stable multivibrator 38 changes state, the presence of the stroke $S_6$ for the numeral "2" propagates through the AND gate 44. Similarly, stroke $S_5$ for numeral "2" propagates through the gate 42 but the absence of stroke $S_7$ causes no output from the AND gate 46 after the monostable multivibrator 38 changes state. The outputs of the AND gates 40, 42, 44 and 46 respectively set the bi-stable multivibrators 48, 50, 52 and 56 in order to memorize the presence of stroke data. These devices, as the bi-stable multivibrator 38 are reset to binary "0" at numeral decision time in preparation for reading the following numeral.

Numeral "4" causes the bi-stable multivibrators 48 and 50 to set but not the bi-stable multivibrators 52 and 54 since the second long vertical stroke occurs before the bi-stable multivibrator 38 changes state. However, a count of two on the output 57 of the counter 56 takes precedence in the numeral logic 86 over the set signals from the bi-stable multivibrators 52 and 54, to decide that numeral "4" is present. The bi-stable multivibrators 48 and 54 set for numeral "5" but not the bi-stable multivibrators 50 and 52. Numeral "6" causes the bi-stable multivibrators 48 and 50 and 54 to set. Lastly, numeral "7" causes the bi-stable multivibrators 52 and 54 to set but not the bi-stable multivibrators 48 and 54.

We now have information on strokes $S_2$, $S_4$, $S_5$, $S_6$ and $S_7$ which is all that is required for decision making in FIG. 8. The numeric logic 86 of FIG. 8 accepts data on these strokes in the form of presence and not presence. Nine lines 1L–9L emanate from the numeral logic 86. For numeral "2," the 2L line generates a binary "1" while the others develop binary "0." For numeral "4" the 4L line develops a binary "1" while the others develop binary "0." With none of the nine emanating from the numeral logic 86 energized, numeral "0" is inferred. These nine lines portray data in decimal form which is then converted to binary form by the binary converter 88. This converter controls four weighted output lines designated as $2^0$, $2^1$, $2^2$ and $2^3$. Numeral "2" causes the $2^1$ line to be energized to binary "1" while the three remaining lines remain at binary "0." Numeral "4" causes the $2^2$ line to be energized to binary "1" while the three remaining lines remain at binary "0." Numeral "6" causes lines $2^1$ and $2^2$ to go to binary "1" while $2^0$ and $2^3$ stay at binary "0." Lastly, numeral "7" causes lines $2^0$, $2^1$ and $2^2$ to go to binary "1" while $2^3$ remains at binary "0." The outputs from the binary converter 88 are in a constant state of flux as a numeral is being scanned and only after the numeral has been scanned are the outputs quiescent and thus indicative of the identity of the numeral. FIG. 9 summarizes in tabular form the binary states of the output lines of the converter 88 for each numeral.

After the numeral has been fully scanned, the memory 90 momentarily samples the data from the binary converter 88 and retains this data until the next numeral is fully scanned. The strobe pulse for causing the memory 90 to update its memory is evolved in this manner: The numeral strobe derived from the adder 30 of FIG. 5, triggers the monostable multivibrator 92 in FIG. 8 at the termination of the numeral strobe waveform. The monostable multivibrator 92 generates a rectangular waveform whose width is sufficiently long to assure that numeral stroke data is fully accumulated before that waveform terminates. At that termination time, the monostable multivibrator 94 is triggered and in turn generates a narrow pulse thereby instructing the memory 90 to momentarily examine its input data. The termination of waveform output by the monostable multivibrator 94 also triggers the monostable multivibrator 96 in turn which generates a narrow pulse. The firing of the monostable multivibrator 96 resets to binary "0" the bi-stable multivibrators 48, 50, 52, 54 and 38 in FIG. 6, and the bi-stable multivibrator 36 in FIG. 5. Binary data from the memory 90 in FIG. 8 is simply converted to machine language such as ASCII by the addition of dummy bits or lines whose outputs are invariant since only the four least significant bits in the ASCII code change for numeral designations. This machine language is then accepted by the tape recorders, modems for data phones, disc recorders, etc. The pulse output from the monostable multivibrator 96 also instructs the external devices as to the proper time to accept data from the electro-optical reader. This is termed "Decision Read Command."

Figure 12A:
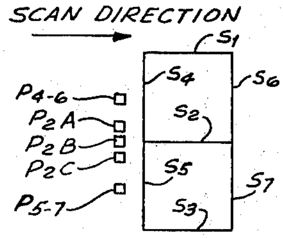
FIG. 12A is a diagram of an array of photocells for scanning a character matrix for detecting misaligned strokes.
Figure 12B:
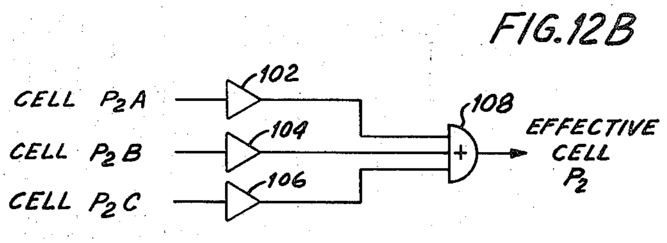
FIG. 12B is a diagram of an amplifier and adder circuit for processing stroke information obtained from the photocell array of FIG. 12A.

Examining FIG. 3B, it is quite evident that vertical misalignment between the numeral being read and the linear photocell array is first manifested by cell P2 missing segment $S_2$. Cells P4–6 and P5–7 tolerate a misalignment up to 25 percent of verticality before they also malfunction but cell P2 is by far the limiting factor when such an aberration occurs. The array of FIG. 12A is a derivative of that of FIG. 3B where cells P2A, P2B and P2C replace cell P2. Thus limited vertical wandering of segment $S_2$ will be tolerated as long as it is detected by cells P2A, P2B, or P2C. Each of the three sub-cells is amplified separately as shown in FIG. 12B by amplifiers 102, 104 and 106. The outputs from these three amplifiers are combined in an adder 108 which produces one output as if only the single cell P2 of FIG. 3B were utilized. Subsequent processing of data in FIG. 5 then remains unaltered.

One long vertical rectangular cell, equal in extent to the total length occupied by cells P2A, P2B, and P2C in FIG. 12A could be employed but system signal-to-noise would suffer. Normally a single cell is either covered by a numeral stroke or not at all so that the depth of modulation is effectively 100 percent. However, a long vertical cell would only be one third covered by the stroke so that a depth of modulation on the order of only 30 percent would be realized. Such operation would render the system more critical to operate from a signal threshold viewpoint. The multiple cell approach provides for increased tolerance of vertical misalignment without compromising system criticality. Of course, more than three cells can be utilized to detect stroke $S_2$ but their total length must be less than 25 percent of numeral height. Additionally, a similar multi-element array can be utilized for detecting stroke $S_1$.

If the character is printed with ink that fluoresces under the influence of ultra-violet light, then single long vertical cells can be employed for strokes $S_1$ and $S_2$ without incurring depth of modulation problems. With fluorescing character strokes, the situation is reversed over ordinary printing where strokes are dark and the background light. Here the strokes are light and the background dark so that regardless of how large the background area is, it never tends to electrically drown out the stroke data.

HANDWRITTEN NUMERALS

The concept of a "self strobing character" hereinbefore described was for a numeral reader, i.e., a character containing at least one continuous horizontal stroke fully encompassing the width of the symbol. A numeral font is easily constructed satisfying this criteria but a complete alphabet of Roman letters is not so simply created; that is one susceptible of being readily machine read and also aesthetically acceptable to the eye. To solve this problem, the linear photocell array of FIG. 3B may be replaced with the array shown in FIG. 10 which is capable of being fabricated by integrated circuit techniques.

Figure 11B:
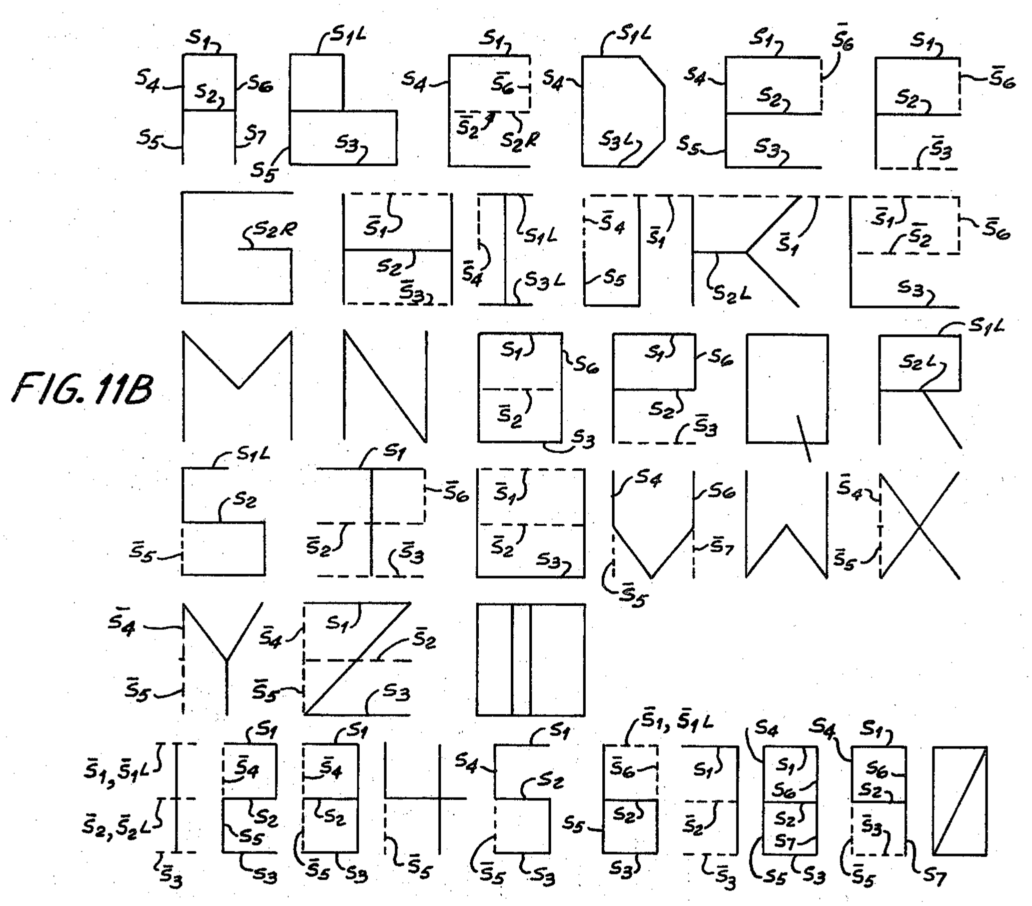
FIG. 11B is a diagram of a font of alphabetical letters and numerals having ideal configurations, with stroke designations.

The small square photocells P1, P2, P3, P4–P6 and P5–P7, may be positioned in the identical manner as that illustrated in FIG. 3B. These then are data cells and no additional character levels need be accommodated. The four vertical rectangular cells R1 through R4 are electrically connected in parallel to each other, as shown in FIG. 10; to form one composite output which in turn is added to the square cell outputs to generate the numeral strobe. Since the separation between each square and the next adjacent rectangle is small, not less than one element of this vertical array is always observing a character segment during scan. Thus the necessity for a "self strobing" arrangement is obviated. The rectangular photocells collect no data but are intended only to participate in the formation of a numeral strobe. FIG. 11B depicts a font capable of interpretation by the array shown in FIG. 10, however, the implementation thereof necessitates additional measurements and logic by subsequent circuits. For purely numeral determination, it was only necessary to ascertain the presence of four vertical strokes in FIG. 1 and one horizontal stroke. The two long vertical strokes were bisected to form the four short vertical strokes $S_4$, Shd 5, $S_6$, and $S_7$ while no such segmentation was required of the horizontal stroke $S_2$. It is now necessary to utilize all three horizontal strokes $S_1$, $S_2$ and $S_3$ (not one) and in addition to bisect these elements. In order to avoid the necessity of devising a new notation, hereafter, a full width horizontal stroke still retains the designation of $S_1$, $S_2$ or $S_3$. A half horizontal stroke to the left of the vertical character centerline is labeled $S_{1L}$, $S_{2L}$, or $S_{3L}$ as illustrated in FIG. 11A. Conversely, a half horizontal stroke to the right of the vertical center-line is labeled Shd 1R, $S_{2R}$ or $S_{3R}$. With reference to FIG. 5, a horizontal stroke detector for numerals consisting of the monostable multi-vibrators 31 and 32, the AND gate 34 and the bi-stable multivibrator 36 was described, which detect the presence of a wide horizontal pulse as contrasted to the narrow pulse which indicated a vertical stroke. However, for the alphabet, the monostable multivibrator 31 is now set to fire after 25 percent of the character has been scanned and not 50 percent as for numeral determination. A second duplication of the monostable multivibrators 31, 32, the AND gate 54 and the bi-stable multivibrator 36 are set to examine the data after 75 percent of the character has been scanned. The bi-stable multivibrator for the 25 percent sample time may be designated 36*a* and the 75 percent device designated 36B. The three stroke possibilities are then determined by three two legged AND gate circuits examining the outputs of the bi-stable multivibrators 36*a* and 36*b*. If the multivibrator 36*a* has a logical "1" but not the multivibrator 36*b*, a half left stroke is indicated. If the multivibrator 36*b* has a logical "1" but not the multivibrator 36*a* a half right stroke is indicated. If both of the bi-stable multivibrators 36*a* and 36*b* contain a logical "1," a long wide stroke is indicated. Whereas for numeral determination, the use of vertical stroke counters is optional for systems' implementation, it is however, essential that in alphabet determination such devices be employed with, in some cases, a count capacity up to four. A tabulation of each character will now be described in words so that the salient distinctive features of each symbol may be defined see also FIG. 11B. It is only necessary for logic to examine the singular features of a character to distinguish it from other symbols:

TABLE OF CHARACTERS

A — All three wide horizontal and all four vertical strokes are utilized. Stroke $S_3$ is missing, which sets "A" apart from numeral "8."

B — The presence of $S_{1L}$, $S_3$ and $S_5$ sufficiently defines the character. Competing characters are "D," "R," and "S."

C — Strokes $S_1$, $\overline{S}_2$, $\overline{S}_{2R}$, $S_4$ and $\overline{S}_6$ are required. Stroke $\overline{S}_2$ sets "C" apart from "A," "E" and "F." $S_{2R}$ sets "C" apart from "G," etc.

D — Strokes $S_{1L}$, $S_{3L}$ and $S_4$. Competition is letter "I."

E — Strokes $S_1$, $S_2$, $S_3$, $S_4$, $S_5$ and $\overline{S}_6$.

F — Strokes $S_1$, $S_2$, $\overline{S}_3$ and $\overline{S}_6$. Stroke $\overline{S}_6$ distinguishes "F" from "P."

G — Stroke $S_{2R}$ is singular.

H — Strokes $\overline{S}_1$, $S_2$ and $\overline{S}_3$. Competition is "A," "C," "E," "F" and numeral "8."

I — Srokes $S_{1L}$, $S_{3L}$ and $\overline{S}_4$. "I" is in competition with "D."

J — Strokes $\overline{S}_1$, $\overline{S}_4$ and $S_5$ are distinctive features. Stroke $\overline{S}_1$ sets "J" apart from numeral "2."

K — Strokes $\overline{S}_1$ and $S_{2L}$are unique.

L — Strokes $\overline{S}_1$, $\overline{S}_2$, $S_3$ and $\overline{S}_6$. Stroke $S_6$ sets "L" apart from "U."

M — A count of four from photocell P4–6 in FIG. 10.

N - A count of three from photocell P4–6 and not a count of three from P5–7.

O - $S_1$, $\overline{S}_2$, $S_3$ $S_6$ and not a court of three from photocells P4–6 and P5–7. Thus "0" is set aside from "$\phi$" and "Q. " The slash through "0" is added to distinguish it from letter "O."

P — Strokes $S_1$, $S_2$, $\overline{S}_3$ and $S_6$ to distinguish it from "F."

Q — Not a count of three from photocell 4–6 and a court of three from P5–7. This distinguishes the letter from "O" and "$\phi$. "

R — Strokes $S_{1L}$, $S_2$ and $\overline{S}_5$. Stroke $\overline{S}_5$ sets "S" Apart from "B."

T — Strokes $S_1$, $\overline{S}_2$, $\overline{S}_3$ and $\overline{S}_6$. Stroke $\overline{S}_6$ sets "T" apart from numeral "7"

U — Strokes $\overline{S}_1$, $\overline{S}_2$ and $S_3$.

V — Strokes $S_4$, $\overline{S}_5$, $S_6$ and $\overline{S}_7$.

W — A count of four from photocell P5–7.

X — Strokes $\overline{S}_4$ and $\overline{S}_5$ and counts of two from photocells P4–6 and P5–7.

Y — Strokes $\overline{S}_4$ and $\overline{S}_5$, a count of two from photocells P4–6 and a count of one from P5–7.

Z — Strokes $S_1$, $\overline{S}_2$, $S_3$, $\overline{S}_4$ and $\overline{S}_5$. Strokes $\overline{S}_4$ and $\overline{S}_5$ set "Z" apart from "O" "Q" and "$\phi$."

1 — Strokes $\overline{S}_1$, $\overline{S}_{1L}$, $\overline{S}_2$, $\overline{S}_{2L}$, $\overline{S}_3$ and a count of one from Photocell P4–6.

2 — Strokes $S_1$, $S_2$, $S_3$, $\overline{S}_4$ and $S_5$.

3 — Strokes $S_1$, $S_2$, $S_3$, $\overline{S}_4$ and $\overline{S}_5$.

4— A count of two from photocell P1 and stroke $\overline{S}_5$ which sets "$" apart from "H."

5 — Strokes $S_1$, $S_2$, $S_3$, $S_4$ And $\overline{S}_5$.

6 — Strokes $\overline{S}_1$, $\overline{S}_{1L}$, $S_2$, $S_3$, $S_5$ and $\overline{S}_6$.

7 — Strokes $S_1$, $\overline{S}_2$ and $\overline{S}_3$.

8 — Strokes $S_1$, $S_2$, $S_3$, $S_4$, $S_5$, and $S_6$.

9 — Strokes $S_1$, $S_2$, $\overline{S}_3$, $\overline{S}_5$ and $S_6$.

$\phi$ — A count of three from both photocells P4–6 and P5–7.

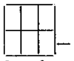– Specialized symbol with a count of four from both photocells P4–6 and P5–7.

For some applications, field formatting of alphabet and numeric characters is permissible and even desired. As an example, the first symbol in a field of data is always a numeric while the second symbol is an alphabet character and so on for the entire record. Thus, the confusion between numeral "8" and letter "B" is averted as well as the ambiguity between letter "S" and numeral "5." Field formatting then permits the electro optical character reader to read both alphabet and numeral characters with the sensor of FIG. 10 but without the necessity of employing the segmentation depicted in FIG. 11A. It is only necessary to determine the presence of strokes $S_{13}$ $S_2$ and $S_3$ and no knowledge of their left and right halves is required. Alphabet characters may now be processed as numerals previously were by subjecting count, horizontal stroke and left edge data to a suitable algorithm in the form of a "truth table" similar to that of FIG. 4A. The sensor of FIG. 3B may also be employed in lieu of the sensor of FIG. 10 by dropping the concept of a self-strobing character. Small vertical strokes above or below the line of characters may indicate to a separate photocell at which point in time a character has been fully scanned. These timing marks may then initiate character decision making.

It should be understood that occasionally small specks of dirt in front of or within a character may cause the counters and/or edge detectors to issue erroneous information, but such dirt specks may become virtually ineffectual if they are smaller than one half a vertical stroke width. For example, if each channel were to sample the data presented to it one half vertical stroke width after its onset and if the data is presented in both halves, it is accepted as valid. The horizontal stroke detector of $S_2$ in FIG. 5 may also employ the same philosophy but may examine its data at a longer delay after its onset.

Although as hereinbefore described with reference to FIG. 2 and FIG. 3*b* the P3 photocell was found to be unnecessary if desired, a photocell may be placed at level $S_3$ in FIG. 3B and its output added to those of the other channels to form a more encompassing character framing waveform. Data from stroke $S_3$ is still not required for numeral determination but permits greater vertical stroke tilt without causing erroneous triggering of the monostable multivibrator 92 of FIG. 8.

If desired a preprinted specialized symbol may precede each record to energize the reader. Such a symbol precludes reading extraneous data if the printed material is incorrectly placed in the electro optical character reader. In addition, random triggering, caused by the edge of the card entering the photocell field of view being read in eliminated. Another specialized symbol de-energizes the electro optical character read after the card passes the cell array. Card edge triggering may also be eliminated by a separate photocell which turns the reader on if light to the cell is blocked by the card. This technique assures that the card edge has entered the array before the reader begins reading.

It should also be noted that a premature readout cycle caused by a character flaw which momentarily turns off the numeral framing strobe in FIG. 8, may be eliminated with a discriminator circuit which examines the composite signal line a short interval after the end of a character is signaled. If the data is still non-existent at this time, then a legitimate end of character command is instituted. Conversely, presence of data at the delayed sample time negates the end of character information as being erroneous.

The linear photocell array may be formed by discrete cell elements or an integrated circuit assembly. The character image on the card being read may be transferred to the discrete array with a simple magnifying optical system exhibiting moderate geometric distortion. The degree of magnification is related to character size and photocell size. For the integrated array, demagnification is normally required to accommodate the image to each sensor. Fiber optics may also be employed to dissect the image and transfer the segment data to discrete cells. The exact method adopted for image transferance is then dictated primarily by the application. For either the discrete or integrated arrays, the photocells must exhibit an adequate temporal response commensurate with minimum pulse width. In general, cadmium sulphide cells are unsuitable while silicon demonstrates acceptable performance characteristics. Spectrally, however, silicon responds best to red and near infra-red radiation and is essentially blind to blue.

Normally, the card being read is moved at a nominally constant speed before the optical assembly array. While manual movement may be generally unsatisfactory as too erratic, nevertheless, precise speed control is not mandatory. A simple induction motor driving a rubber belt or a set of rollers has proved to be satisfactory. The rubber belt or rollers engage the card being read and move the card at an essentially constant speed before the photocell array.

Insofar as alignment is concerned, lateral card alignement is critical to insure that each photocell observes the proper character level. Longitudinal alignment is of no consequence, while rotational misalignment must be minimized as it manifests itself in the form of lateral terms.

Although a card with printing has been mentioned, it is by no means the only medium capable of being read. For example, a continuous paper tape with a font may also be read. Such a tape is obtainable from commercially available strip printers and may be handled with a mechanism similar to that contained in good magnetic tape machines.

It should be understood that the foregoing relates to only a preferred embodiment of the inention, and that is is intended to cover all changes and modifications of the example of the invention herein chosen for the purposes of the disclosure, which do not constitute departures from the spirit and scope of the invention.

The invention claimed is:

1. An optical character reader for optical visible characters having verticle and horizontal strokes comprising:

a first optical means for scanning a top horizontal stroke of said character;

a second optical means for scanning verticle strokes in the upper half of said character;

a third optical means for scanning a middle horizontal stroke of said character; and a fourth optical means for scanning vertical strokes in the lower half of said character;

a first circuit means responsive to signals from said first and said third optical means for producing a first timing signal indicating the passage of more than one-half the width of said character and for producing a signal indicating the presence of a middle horizontal stroke of said character:

a second circuit means responsive to said second optical means, said fourth optical means and said second timing signal for indicating the presence of any of said vertical strokes; and logic circuit means connected to said first and second circuit means for producing data bits indicative of said character.

2. An optical character reader as recited in claim 1 wherein said first circuit means includes means for producing a second timing signal indicating the width of said character and wherein said optical character reader further includes a memory means connected to said logic circuit and responsive to said second timing signal for receiving said data bits from said logic circuit.

3. An optical character reader as recited in claim 1 further comprising a third circuit means connected to said first optical means for counting the number of pulses therefrom, the output from said third circuit means connected to said logic circuit means whereby a pre-determined count from said third circuit means deactivates a portion of said logic circuit to prevent erroneously decoding of said character.

4. An optical character reader as defined in claim 1 wherein said optical means comprises photoelectric cells which are closely spaced for detecting irregularities in portions of the strokes of said character.

5. An optical character reader as recited in claim 1 wherein said second circuit means comprises a logical circuit including gates and pulse generators.

6. An optical character reader as recited in claim 1 wherein said second circuit means comprises a logic circuit including gates and counters.

7. An optical character reader as recited in claim 2 further including fourth circuit means responsive to said second timing signal and connected to said first circuit means and said second circuit means for clearing all stroke data therein when scanning of each of said characters is completed.

* * * * *